(12) United States Patent
Colvin

(10) Patent No.: US 6,484,264 B1
(45) Date of Patent: *Nov. 19, 2002

(54) METHOD FOR PROVIDING REPEATED CONTACT WITH SOFTWARE END-USER USING AUTHORIZED ADMINISTRATOR

(75) Inventor: David S. Colvin, Commerce Township, MI (US)

(73) Assignee: Z4 Technologies, Inc., Commerce Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/573,771

(22) Filed: May 18, 2000

Related U.S. Application Data

(63) Continuation of application No. 09/535,321, filed on Mar. 27, 2000, which is a continuation of application No. 09/090,620, filed on Jun. 4, 1998, now Pat. No. 6,044,471.

(51) Int. Cl.$^7$ ................................................ H04L 9/32
(52) U.S. Cl. ..................... 713/202; 709/229; 705/51
(58) Field of Search ................... 713/200, 201, 713/202; 705/51, 52, 53, 55, 57, 59, 14; 709/229

(56) References Cited

U.S. PATENT DOCUMENTS

| | | | |
|---|---|---|---|
| 4,796,220 A | | 1/1989 | Wolfe |
| 4,827,508 A | | 5/1989 | Shear |
| 5,182,770 A | | 1/1993 | Medveczky |
| 5,287,408 A | | 2/1994 | Samson |
| 5,341,429 A | | 8/1994 | Stringer |
| 5,495,411 A | * | 2/1996 | Ananda ........................ 705/32 |
| 5,509,070 A | | 4/1996 | Schull |
| 5,548,645 A | * | 8/1996 | Ananda ........................ 380/4 |
| 5,564,038 A | | 10/1996 | Grantz |
| 5,579,479 A | | 11/1996 | Plum |
| 5,606,614 A | * | 2/1997 | Brady et al. ................ 235/380 |
| 5,638,513 A | * | 6/1997 | Ananda ........................ 713/202 |

(List continued on next page.)

OTHER PUBLICATIONS

Magid, "Software Rentals Revisited– The growth of the Internet, intranets, and extranets has revived the concept of renting software and added a twist" Aug. 19, 1997, Informationweek, n 644, p. 132.*

Li et al, "Matlab Tutorial" Jan. 3, 1999, http://www.me.umn.edu/courses/me4232/tutorial.html.*

Primary Examiner—Gilberto Barron, Jr.
Assistant Examiner—Christopher A. Revak
(74) Attorney, Agent, or Firm—Brooks & Kushman, P.C.

(57) ABSTRACT

A method for providing repeated contact with computer software or a software user to transfer information which may include advertising, promotional, and/or marketing information includes repeatedly contacting the software manufacturer or third party representative or agent for continued use of the software. The invention provides for automatically obtaining authorization information in addition to marketing, advertising, and/or promotional information prior to expiration of each authorization interval or period. The user and/or software contacts an authorized representative of the software to obtain authorization information which may be downloaded directly to the software or provided to the user for entry. Authorization intervals may vary depending upon the particular application. For example, in one embodiment, the present invention provides authorization information which allows continued use of the software for a period based on value of the software. The value of the software may be based on price or the availability of a subsequent version of the software. Authorization intervals of decreasing length may be supplied for software of increasing value. As the value of the software decreases, for example when one or more subsequent versions are released, the authorization intervals may increase accordingly.

20 Claims, 6 Drawing Sheets

U.S. PATENT DOCUMENTS

| | | | |
|---|---|---|---|
| 5,652,793 A | | 7/1997 | Priem |
| 5,771,347 A | * | 6/1998 | Grantz et al. ............... 713/200 |
| 5,790,664 A | | 8/1998 | Coley et al. |
| 5,812,764 A | * | 9/1998 | Heinz, Sr. .................. 713/202 |
| 5,842,124 A | | 11/1998 | Kenagy |
| 5,845,077 A | * | 12/1998 | Fawcett ..................... 709/221 |
| 5,848,397 A | * | 12/1998 | Marsh et al. ................. 705/14 |
| 5,991,402 A | * | 11/1999 | Jia et al. ....................... 705/59 |
| 6,029,145 A | * | 2/2000 | Barritz et al. ................. 705/34 |
| 6,049,671 A | * | 4/2000 | Slivka et al. ................. 717/11 |
| 6,073,214 A | * | 6/2000 | Fawcett ..................... 711/133 |

* cited by examiner

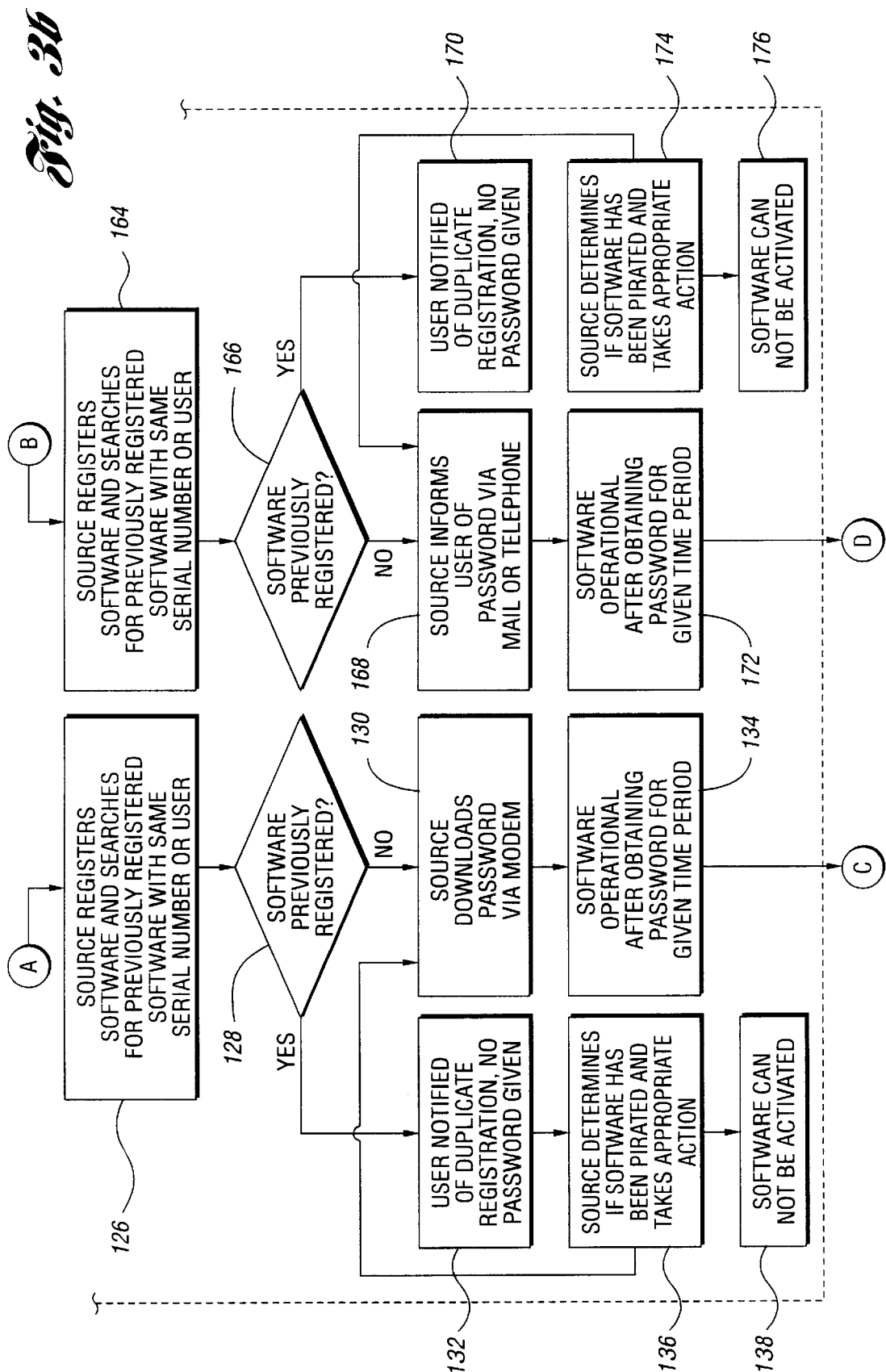

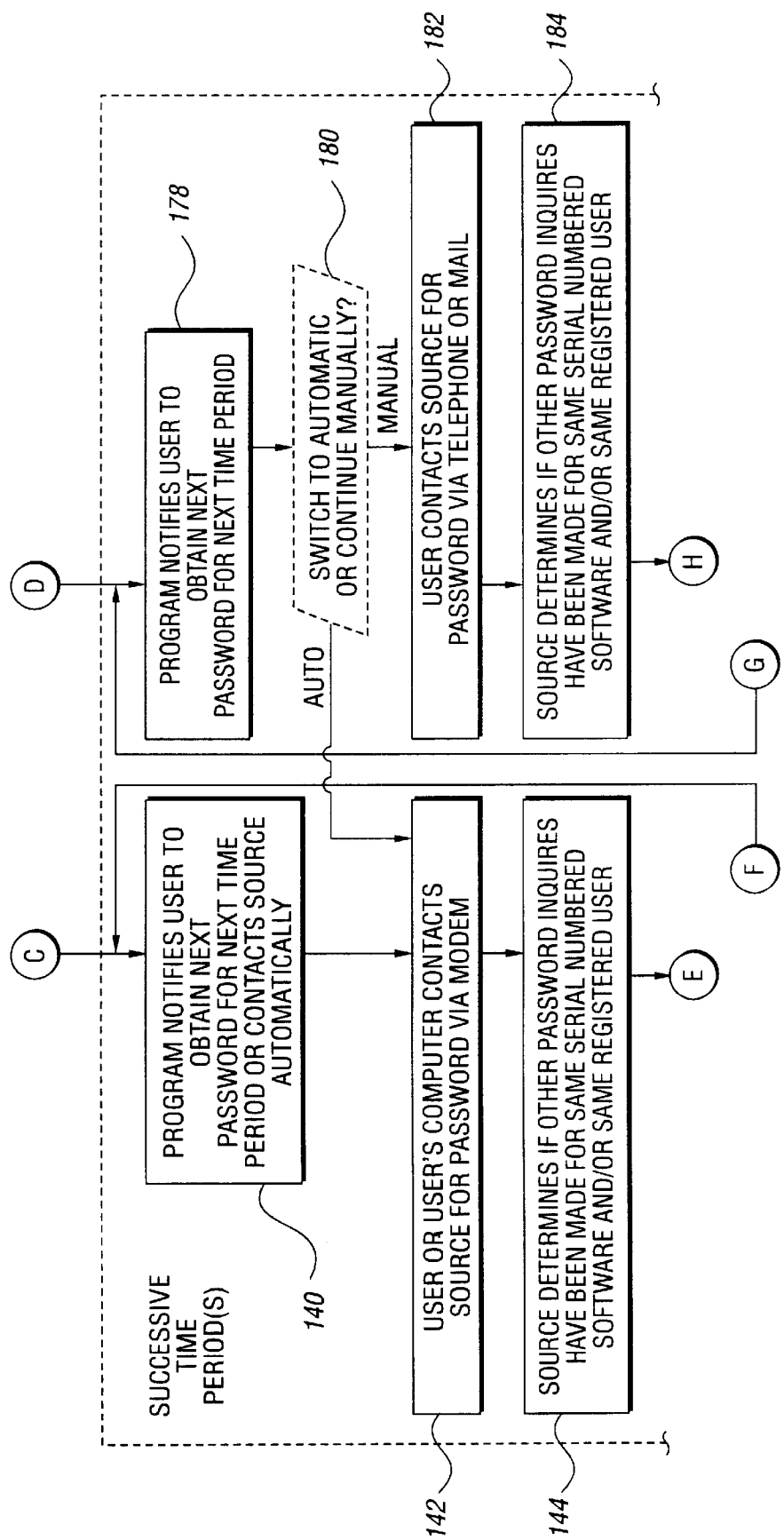

METHOD FOR PROVIDING REPEATED CONTACT WITH SOFTWARE END-USER USING AUTHORIZED ADMINISTRATOR

CROSS-REFERENCE TO RELATED APPLICATIONS

This application is a continuation of U.S. Patent application Ser. No. 09/535,321, filed Mar. 27, 2000 which is a continuation of U.S. patent application Ser. No. 09/090,620, filed Jun. 4, 1998, now U.S. Pat. No. 6,044,471, the disclosures of which are hereby incorporated by reference in their entirety.

Technical Field

The present invention relates to methods for repeatedly contacting software and/or software end-users and providing information, such as software passwords, marketing, advertising, and/or promotional material using a authorized software administrator.

BACKGROUND ART

Software developers are often victims of illicit copying and unauthorized use of their software in violation of contractual obligations imposed by licensing agreements and subject to civil and criminal penalties under various domestic and foreign laws. Unauthorized entities range from a relatively small percentage of the total users to an overwhelming majority of illegal users. Such unauthorized use not only amounts to theft of the developers' intellectual property, but also reduces the number of programs sold and therefore the associated profitability of the developer. This may ultimately diminish the creative effort expended by the software developers due to the reduced financial incentive. The advent of the Internet has contributed to the proliferation of pirated software, known as "warez", which is easily located and readily downloaded.

Various strategies have been employed to make unauthorized duplication and use of software more difficult. One such approach is to provide a hardware "key" which is typically installed in the parallel port of the computer to provide a software interlock. If the key is not in place, the software will not execute. This method is relatively expensive for the developer and cumbersome for the authorized user while remaining vulnerable to theft by duplication of the hardware key.

Another approach requires the user to enter a serial number or customer identification number during installation of the software. Missing or invalid registration information prevents installation of the software. This approach is easily defeated by transferring the serial number or customer identification number to one or more unauthorized users.

Yet another approach requires registering the software with the manufacturer or distributor to obtain an operational code or password necessary for installation of the software. Again, once the operational code or password is obtained, it may be perpetually transferred along with pirated copies to numerous unauthorized users.

Various copy protection strategies have been employed to reduce the number of unauthorized copies available. This approach is generally disfavored by users who may have a legitimate need to make backup or archival copies or transfer a copy to a new computer or hard drive.

While prior art strategies have enjoyed various levels of success in reducing unauthorized use of software, they often impose a significant burden on the authorized users or are easily defeated by unauthorized users. As such, software developers need an apparatus and/or method for reducing unauthorized use of software which does not burden the authorized users to dissuade them from purchasing and using the protected software.

SUMMARY OF THE INVENTION

Thus, one object of the present invention is to provide an apparatus and method for improving software security throughout the lifetime of the software.

Another object of the present invention is to provide an apparatus and method for monitoring the number of users of a software product, both authorized and unauthorized.

Yet another object of the present invention is to provide an apparatus and method for the software manufacturer to maintain contact with the user over an extended period of time to provide repeated opportunities for promotional and marketing purposes, for example.

A further object of the present invention is to provide a method and apparatus for reducing unauthorized use of software which facilitate periodic software updates and forwarding of information, when and if desired.

A still further object of the present invention is to identify those entities responsible for unauthorized copying or use of software so that appropriate action may be taken, such as disabling the software, requesting payment from the user, or seeking civil or criminal penalties.

Another object of the present invention is to provide a method and apparatus for reducing unauthorized software use which deactivates unauthorized copies when an unauthorized user attempts to obtain a password.

In carrying out the above objects and other objects, features, and advantages of the present invention, a method for providing continuing contact with a software user to repeatedly transfer information to the user includes receiving registration information from the user, transferring authorization information to authorize continued use of the software beyond a current authorization interval, and transferring marketing, promotional, or advertising information each time the user or software requests authorization for continued use beyond the current authorization interval. In one embodiment, the present invention transfers authorization information which authorizes use of the software for an authorization interval based on value of the software with value being determined by retail price or the availability of subsequent versions, for example. The user or software may automatically contact a manufacturer or authorized agent preferably prior to expiration of the current authorization interval to provide continuous uninterrupted operation of the software.

The present invention contemplates, but does not require, more frequent password updates for more complex software because it is generally more costly to develop (and therefore more valuable to users) whereas less costly software would require fewer password updates to reduce administrative costs associated with password maintenance.

Password or authorization code updates may be obtained automatically or manually. Automatic updates are accomplished using electronic communication between the manufacturer's computer (or an authorized representative) and the user's computer. Updates may be performed by a direct modem connection, via email, a web browser, or the like. The particular time and nature of updates and the user interface utilized to implement the updates may vary by manufacturer or product. Manual updates are performed by advance or periodic notifications generated by the software to alert the user that password updates are required or will be required in the near future. The user may then contact the manufacturer for the specific password update via telephone, mail, email, or the like. Password advisories normally occur prior to the periodic termination of the operating period which may be measured by program starts, elapsed running time, calendar period, etc. Password updates may be in the form of alphanumeric and/or encrypted passwords or of any other conventional type.

Preferably, the user must provide registration information prior to receiving the original or updated password or authorization code. Registration information may be entered by the user or automatically acquired (and transmitted for automatic updates) by the software. Registration information may include a serial number, registration number, TCP/IP address, user name, telephone number, computer specific information, etc. This information may be encoded and/or encrypted to make it less susceptible to tampering by unauthorized users. The registration information is preferably monitored and compared to previously captured information to control the number of authorized copies of software and/or identify unauthorized users. If unauthorized use is suspected, a password or authorization code may be provided which subsequently disables the software, either immediately or after some period of time so that an authorized user is provided an opportunity to rectify the information which caused deactivation.

A number of advantages result from various implementations of the present invention. For example, the present invention reduces unauthorized use of software without imposing a significant burden on authorized users. The present invention controls the number of copies of authorized software by monitoring registration information and deactivation of suspected pirated copies. Requiring authorized users to periodically update a password or authorization code provided by a password administrator improves accuracy of contact information for marketing related products and distribution of product updates. The present invention also provides a variable level of software security which can be tailored to the particular application depending upon the value of the application to potential software pirates. By providing an apparatus and method for the software manufacturer to maintain contact with the user over an extended period of time, the present invention provides repeated opportunities for promotional and marketing purposes, for example. This feature of the invention facilitates periodic forwarding of information, such as advertising, marketing, and promotional information, when and if desired.

The above advantages and other advantages, objects, and features of the present invention will be readily apparent from the following detailed description of the best mode for carrying out the invention when taken in connection with the accompanying drawings.

BRIEF DESCRIPTION OF THE DRAWINGS

FIGS. 3a–3d provide a more detailed flow diagram illustrating representative embodiments of a method and apparatus for securing software according to the present invention.

BEST MODE(S) FOR CARRYING OUT THE INVENTION

Figure 1:
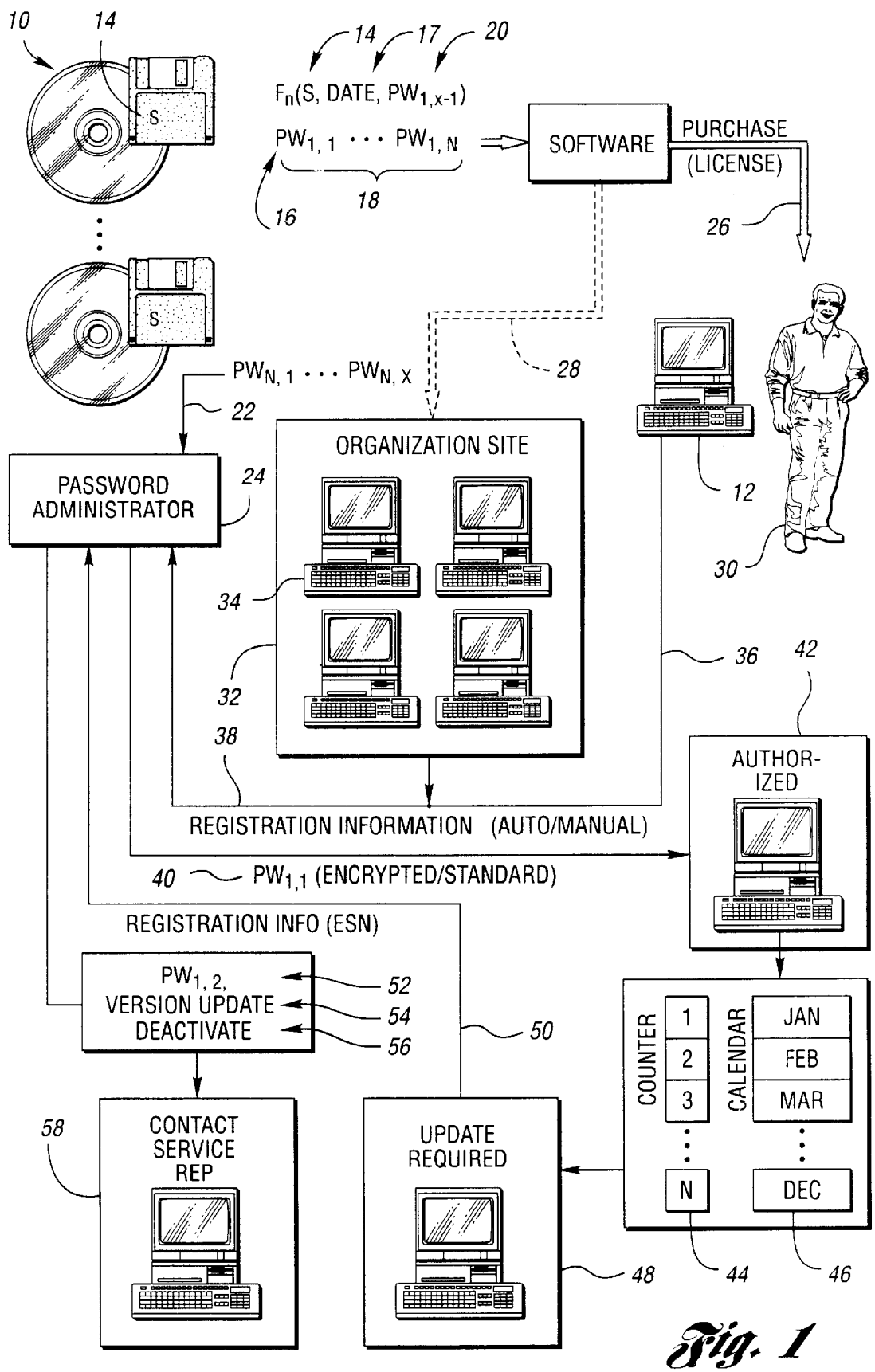
FIG. 1 is a block diagram illustrating various features of a method and apparatus for securing software according to the present invention.

Referring now to FIG. 1, a block diagram illustrating various features of a method and apparatus for securing software according to the present invention is shown. Manufacturers or developers create application programs or software which is stored in the form of data representing program instructions executable by a computer on computer readable media 10. Computer readable media 10 may include any medium capable of storing such instructions which is directly or indirectly readable by a computer, such as computer 12. Computer readable media may include floppy disks, hard drives, CD-ROMs, floptical disks, magnetic tape, and the like. Each copy or group of copies of the software may have an associated serial number, indicated generally by reference numeral 14, and an associated password 16 which may be one of a series of associated passwords 18 as explained in greater detail below. Each password 16 may be an alphanumeric character string which may be encoded or encrypted or a binary or hexadecimal machine readable string to resist tampering by unauthorized users. Passwords 16 within series 18 may be randomly assigned or may be generated using a suitable algorithm, many of which are known in the art. Likewise, passwords 16 may be based on serial number 14, a current date or version date 17, and/or a previous password 20 from the series of passwords.

After the password or passwords are created and associated with one or more serial numbers or copies of the software, they may be transferred to an authorized representative of the software, as represented by arrow 22, such as a password administrator 24. Of course, the original manufacturer or developer of the software may also function as password administrator 24. The software may be distributed by purchase or more commonly it is licensed as represented by arrows 26 and 28 to individuals 30 and groups 32, respectively. Preferably, the software is distributed to the end users without its associated password 16 which must be obtained from password administrator 24. Alternatively, computer readable media 10 may be distributed with the first password 16 of a series of passwords 18. Each authorized user preferably has software with a unique identifier, such as a serial number, whether the authorized user is an individual, such as user 30, or a group or region, indicated generally by reference numeral 32. However, the same password or series of passwords may be associated with a number of serial numbers to reduce the administrative burden for password administrator 24. For example, each end user 34 associated with organization or site 32 may have the same password or series of passwords. Preferably, not more than one password is distributed with each authorized copy so that the end users will need to contact password administrator 24 to obtain additional passwords for continued use of the software as explained in greater detail below.

During the initial use or installation of the software on computers 12,34, a password or authorization code will be required by the software to function properly. The end user must contact the authorized representative for the software, such as password administrator 24, to obtain the appropriate authorization code or password as indicated generally by arrows 36. Password administrator 24 obtains registration information 38 from the end user and provides an appropriate password or authorization code to the software as indicated by reference numeral 40. Communication of registration information and the authorization code may be accomplished either manually or automatically depending upon the particular application and configuration of the software. Manual communication may be by email, regular mail, telephone, automated voice response system, web browser, direct modem transfer, or the like but requires a varying level of intervention by the end user depending upon the particular type of communication. Automatic communication may use similar methods or means to communicate the information but is performed without user intervention, although the user may be advised or notified that the process is occurring or has occurred.

Registration information 38 may include traditional contact information, such as name, address, email, phone, etc. but preferably includes information which can be obtained without intervention by the end user to improve its veracity. Such information may include identification of a TCP/IP address, originating telephone number, or computer-specific information associated with the end user. Computer-specific information may include an electronic serial number (ESN) which uniquely characterizes the hardware configuration of the computer based on information stored in the computer's non-volatile CMOS, registry, motherboard serial number, or the like. Password administrator 24 preferably stores the registration information to be used for various purposes according to the present invention to reduce unauthorized use of software. For example, password administrator 24 may use the registration information to monitor compliance with licensing terms by determining whether a particular serial number has been installed on more than one computer or by more than one end user. Administrator 24 may compare the registration information with previously received registration information to determine whether to issue an authorization code or password, or to provide a code which disables further operation of the software. The registration information may also be used to contact the end users for marketing new products or versions, or providing software updates.

The password or authorization code is communicated to the software as represented by reference numeral 40. Depending upon the particular implementation, the password may be provided to the end user who manually enters the information into the computer 42 to begin or continue using the software. The password or authorization code may be encoded as an alphanumeric string using various numbers and letters which represent meaningful information to the administrator but appear to be randomly generated to the end user. Alternatively, an encryption algorithm may be used to transmit the information. Preferably, the password authorizes the software to execute on computer 42 for a first predetermined period as represented by counter 44 or calendar 46. The predetermined period may vary based on the particular authorized user, the cost of the software, the number of estimated unauthorized copies, etc. For example, it is anticipated that more expensive software would provide a shorter period of authorization to provide a higher level of security. The higher revenue generated by the software offsets any increased administrative expense of password administrator 24 due to the increased frequency of updates required.

As indicated by counter 44 and calendar 46, the authorized period of use may be measured either in calendar days (months, years, etc.) or in execution hours, number of accesses, or the like. Once the authorized period expires, the software requires a new password or authorization code as indicated by reference numeral 48. This may be accomplished automatically and transparently to the end user by electronically contacting password administrator 24 and exchanging current registration information 50. Administrator 24 may compare the current registration information 50 with previously received registration information to determine if at least a portion of the information matches for that particular serial number or group of serial numbers. This comparison may be used to determine whether the end user is an authorized user or an unauthorized user.

The information provided to the software by administrator 24 may depend upon whether the user is determined to be authorized or unauthorized. For example, if the user is determined to be an authorized user, a subsequent password 52 from the series of passwords associated with the software serial number or group may be communicated which authorizes the software for an additional operation period. As the software becomes less valuable, such as when new versions are released, the authorization period may increase and preferably eventually allows indefinite use of the software. Of course, an exceedingly long period (10 years for example) may be essentially equivalent to an indefinite period of operation. In addition to a subsequent password, an updated version 54 of the software may be transferred or offered to the end user. If the user is determined to be an unauthorized user, an appropriate message may be transmitted to alert the user to a discrepancy in the registration information, and the operational password may be withheld. Alternatively or in addition, a code 56 which deactivates the software may be communicated. As another alternative, a shortened authorization period may be provided along with a password and a message which indicates the end user must contact administrator 24 or another customer service representative to verify the user's status as represented by reference numeral 58. In the event the user is determined to be unauthorized, password administrator 24 may decline to download a password at which time the software may automatically become inoperative after the current operational period has lapsed.

Figure 2:
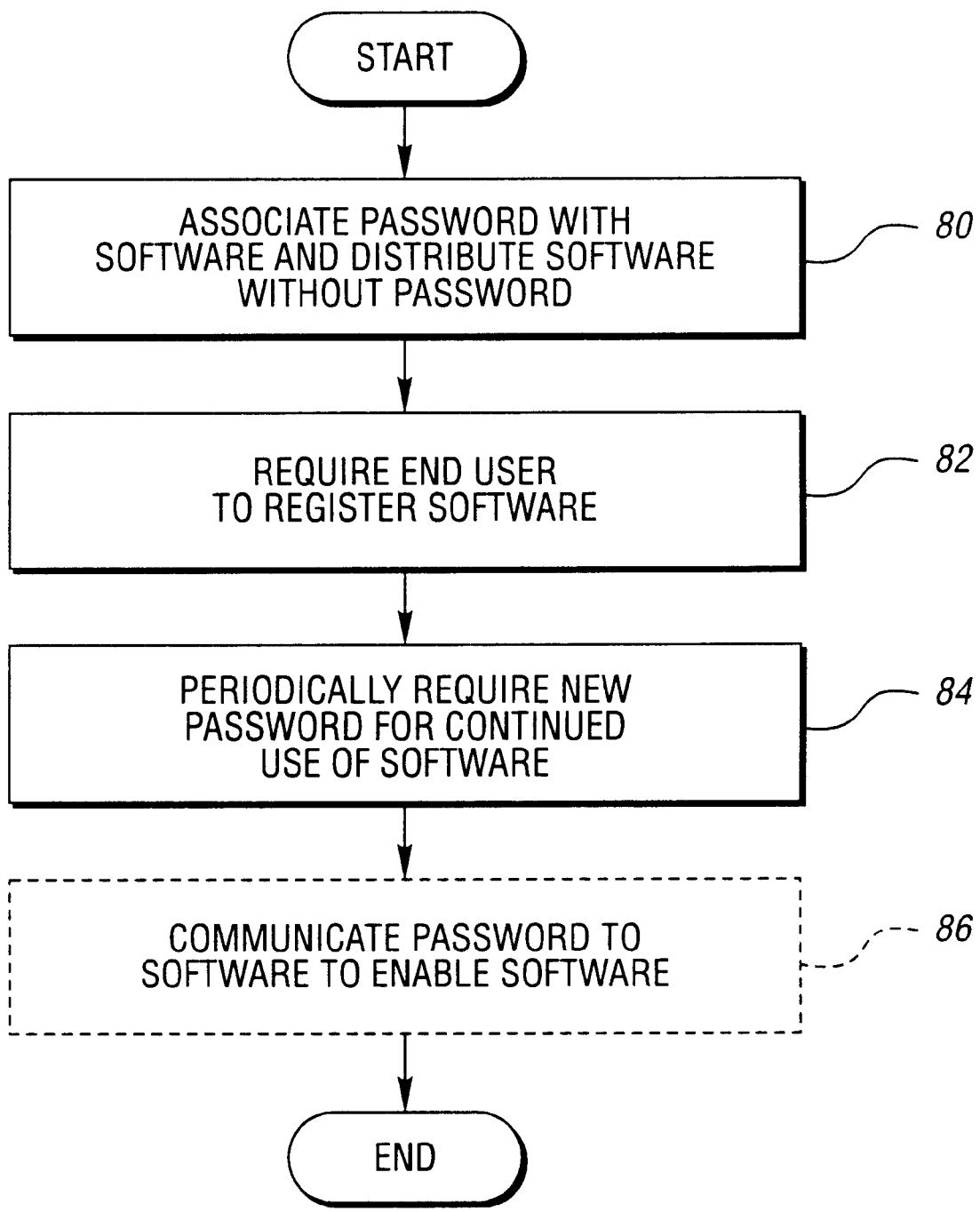
FIG. 2 is a flow diagram illustrating generally a method for securing software according to the present invention.

Referring now to FIG. 2, a flow diagram generally illustrating a method for securing software according to the present invention is shown. A password or series of passwords is associated with a particular copy or group of copies of software prior to distribution (without the password or with only one of a series of passwords) as represented by block 80. A series of passwords may be associated with the software using an appropriate password generation algorithm with parameters which vary based on the particular copy. For example, an algorithm or mathematical equation or formula may be used to generate passwords with one or more of the parameters of the equation corresponding to letters or characters in the serial number of the software.

For applications which have only a single password for each copy or group of copies, the password may not be distributed with the software so the end user must contact the developer or authorized representative as represented by block 82. For applications with two or more passwords, an initial password may be provided or the software may operate without a password for a first period to provide ample opportunity for the end user to acquire the initial/subsequent password. Registration information may be required as a precondition to providing a valid authorization code or password. This allows the developer or authorized representative to monitor compliance with licensing terms and/or take appropriate action for unauthorized users.

The password or authorization code is communicated to the software as represented by block 84 to make the software operational on the end user's computer. This may be performed automatically, without user intervention, or manually when initiated by the user using various communication channels, such as regular mail, email, web browser, direct modem connection, etc. The method may optionally require periodic updates at regular, irregular, or random intervals based on elapsed running time, calendar time, or the like, as represented by block 86. The software may prompt the user when the end of the authorization period is approaching to provide an opportunity to obtain a subsequent authorization code for continued use of the software.

Figure 3A:
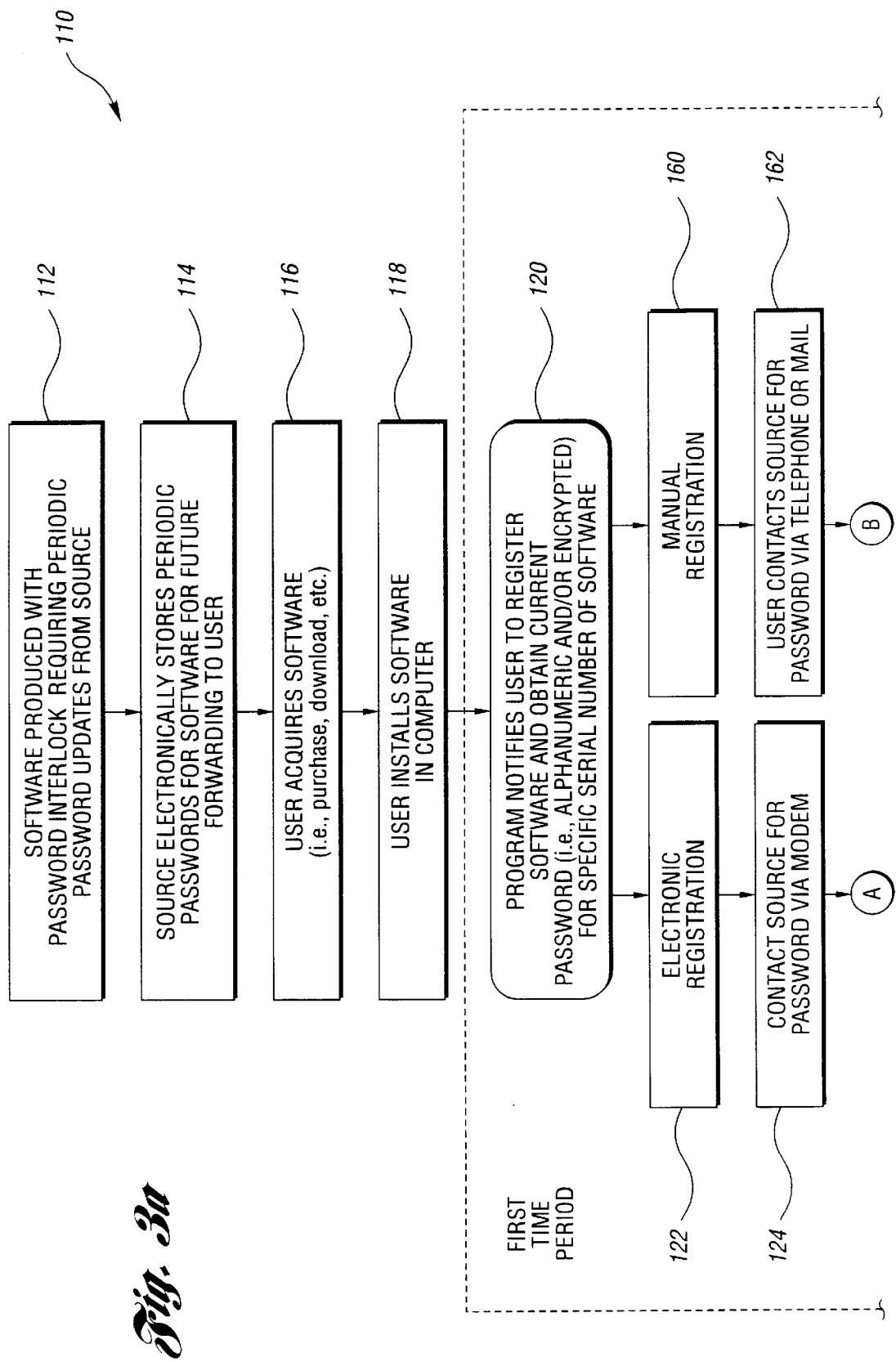

Referring now to FIG. 3*a*, a more detailed flow diagram illustrating a method and/or apparatus for securing software according to the present invention is shown. The software manufacturer or developer (source) produces software which requires initial and/or periodic password updates to become or to remain operational as depicted in box 112. Software may be associated with individual end users, a regional (geographic) or other group of users, or users associated with a particular organization or site. Providing passwords or authorization codes for groups rather than each individual significantly reduces the number of passwords required and the corresponding administrative overhead including electronic storage and transmission requirements.

Following production by the software manufacturer, the source electronically stores the password information for future transmission to the user as shown in box 114. The password information may be the actual passwords or information used to generate subsequent passwords based on the individual copy or group of copies of the software. The embodiment depicted in FIGS. 3*a*–3*d* is intended to interlock specific pieces or groups of software with corresponding passwords or authorization codes.

Once the software is acquired by the user 116, the user installs (partially or fully) the software in his computer or computer network 118. Following installation of the software, the user is prompted to register the software and obtain the necessary operational password which may be an alphanumeric string which is encoded or encrypted, or a binary (machine readable) code. The user is allowed to choose between automatic or manual registration 120. If automatic registration is selected 122, the program automatically contacts the source via a modem or other connection to obtain the operational password following registration 124.

Figure 3B:
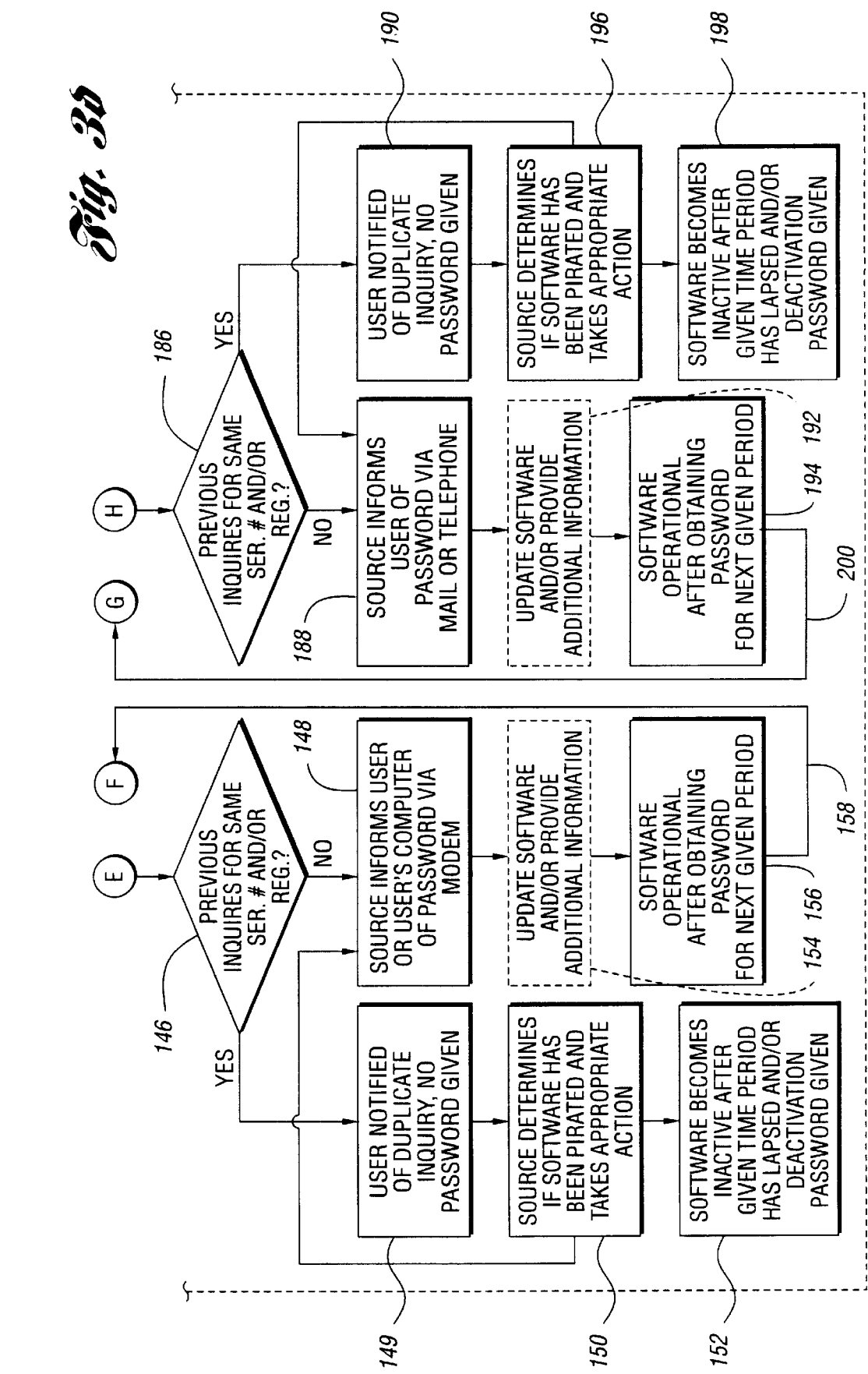

Once contacted, the source searches for previous registration of the software with the registration number or user identification 126, as shown in FIG. 3*b*. If the software has not been previously registered 128, the source transmits the necessary password 130 wherein the software becomes operational 134. If registration information has been previously entered and does not match the current registration information, the source notifies the user of a previous registration of the same software 132 and thereafter takes appropriate action 136. Such action can either include denying the necessary operational password 138, continuing the password download if the source desires 130 or other appropriate action or actions.

Following the initial registration of the software and downloading of the first operational password, the software remains operational for a given interval which may be an operation period or time period (random, regular, or irregular). Once the first interval expires, the program notifies the user of the necessity to obtain the next operating password 140, as shown in FIG. 3*c*. The user's computer contacts the source via modem 142 and the source determines if previous inquiries have been made for the same user 144 based on the registration information. These step(s) may be fully automated, thereby eliminating the need for user intervention or notifying the user.

The source either transmits the password 148 or notifies the user of a duplicate inquiry 149, as shown in FIG. 3*d*. If a duplicate inquiry has been made, the source either declines to download 150 the password so that the software becomes non-operational 152 after the current operational period elapses or the source transmits the password 148 if desired. During any of the contact periods between the source and the user, the source may elect to download software updates or additional information 154 which may include promotional, marketing, advertising, or other information. Following the downloading of the necessary operational password, the software becomes or remains operational 156. This sequence is selectively repeated 158 as determined by the authorization interval selected by the source and communicated to the software. As such, the present invention provides an apparatus and method for the software manufacturer to maintain contact with the user over an extended period of time to provide repeated opportunities for transferring information such as promotional, advertising, and marketing information, for example.

As shown in FIG. 3*a*, the user may have the option of manual registration 160 and password input as opposed to automatic registration. Alternatively, the source may require manual registration to verify the accuracy of at least some of the registration information since it will be used to send the authorization code or password to the user. If the user provides inaccurate information, the password will not be transmitted and the software will not be operational. After initial registration, optionally the user may elect to convert to automatic electronic contact at any time. Where manual registration is selected 160 (or required), the user contacts the source via telephone, mail, email, Internet, or the like to obtain the operational password following registration 162.

Once contacted, the source searches for previous registration of the software with the same serial number, registration number or user identification 164, as shown in FIG. 3*b*. If the software has not been previously registered 166, the source transmits the necessary password 168 wherein the software becomes operational 172. If a duplicate registration occurs, the source notifies the user of a previous registration of the same software 170 and thereafter takes appropriate action 174. Such action can either include not providing the necessary operational password 176 or continuing the password transmission if the source desires 168.

Following the initial registration of the software and transmission of the first operational password, the software remains operational for a given operation interval after which the software notifies the user of the necessity to obtain the next operating password 178, as shown in FIG. 3*c*. The user contacts the source via telephone or by mail 182 and the source determines if previous inquiries have been made for the same user 184. The user may elect to convert to automatic electronic registration during this period 180, however, this step is optional.

The source either transmits the password 188 or notifies the user of a duplicate inquiry 190, as shown in FIG. 3*d*. If a duplicate inquiry has been made, the source either declines to download the password 196 (after which the software becomes non-operational 198) or the source transmits the password 188 if desired. During any of the contact periods between the source and the user, the source may elect to transmit software updates or additional information 192. Following the downloading of the necessary operational password, the software becomes or remains operational 194. The sequence for successive operation intervals may then be repeated at the source's discretion 200.

It is understood that the representative methods of the present invention do not need to continue after initial registration and password transmission. Likewise, the process may me discontinued at some point in time by downloading a lifetime password that authorizes the software indefinitely. For example, this may be desirable after the software is deemed obsolete. It is further understood that the specific sequencing of events is not necessary for the proper implementation of the present invention. The invention further allows for compatibility with existing software or other security measures.

While the best modes for carrying out the invention have been described in detail, those familiar with the art to which this invention relates will recognize various alternative methods for carrying out the invention as described by the following claims.

What is claimed is:

1. A method for providing repeated contact between an administrator and a user computer, computer software, or a computer software user, the method comprising:

automatically receiving information from the computer software by the administrator;

transferring a password from the administrator to the user computer, the computer software, or the user to authorize continued use of the computer software such that the computer software is useable without requiring continuous communication between the administrator and the user computer, the computer software, or the user; and repeating the steps of automatically receiving and transferring at predetermined periods without requiring continuous communication between the administrator and the user computer, the computer software, or the user during periods other than the predetermined periods.

2. The method of claim 1 wherein the step of transferring a password is performed only after obtaining valid registration information.

3. The method of claim 2 wherein obtaining valid registration information comprises comparing registration information with registration information obtained during first use of the computer software.

4. The method of claim 1 wherein the predetermined periods include a period based on a clock and/or calendar.

5. The method of claim 1 wherein the predetermined periods include a period based on elapsed execution time of the computer software.

6. The method of claim 1 wherein the predetermined periods include a period based on a version number associated with the computer software.

7. The method of claim 1 wherein the predetermined periods include random periods.

8. The method of claim 1 wherein the predetermined periods include a period based on number of times the computer software is executed.

9. A method for providing repeated contact between an administrator and a user computer, computer software, or a software user, the method comprising:

automatically receiving information from the computer software by the administrator;

transferring a password from the administrator to the user computer, the computer software, or the user to authorize continued use of the computer software such that the computer software is useable without requiring continuous communication between the administrator and the user computer, the computer software, or the user;

transferring software information, software upgrades, marketing, promotional, or advertising information from the administrator to the user computer, the computer software, or the user with the transferred password; and repeating the steps of automatically receiving, transferring a password, and transferring software information, software upgrades, marketing, promotional, or advertising information at specified periods without requiring continuous communication between the administrator and the user computer, the computer software, or the user during periods other than the predetermined periods.

10. The method of claim 9 wherein the step of transferring software information is performed only after obtaining valid registration information.

11. The method of claim 10 wherein obtaining valid registration information comprises comparing registration information with registration information obtained during first use of the computer software.

12. The method of claim 9 further comprising transferring an authorization code from the administrator to the user computer, the computer software, or the user to authorize continued use of the computer software for an authorization interval.

13. The method of claim 12 wherein the authorization interval is equal to one of the specified periods.

14. The method of claim 12 wherein the specified periods and/or the authorization interval are based on a new version of the computer software being released such that the authorization interval increases based on a member of subsequently released versions of the computer software.

15. The method of claim 9 wherein the specified periods include a period based on a clock and/or calendar.

16. The method of claim 9 wherein the specified periods include a period based on elapsed execution time of the computer software.

17. The method of claim 9 wherein the specified periods include a period based on a version number associated with the computer software.

18. The method of claim 9 wherein the specified periods include random periods.

19. The method of claim 9 wherein the specified periods include a period based on number of times the computer software is executed.

20. The method of claim 9 wherein the specified periods include regular but unequal periods.

* * * * *